Figure 1:
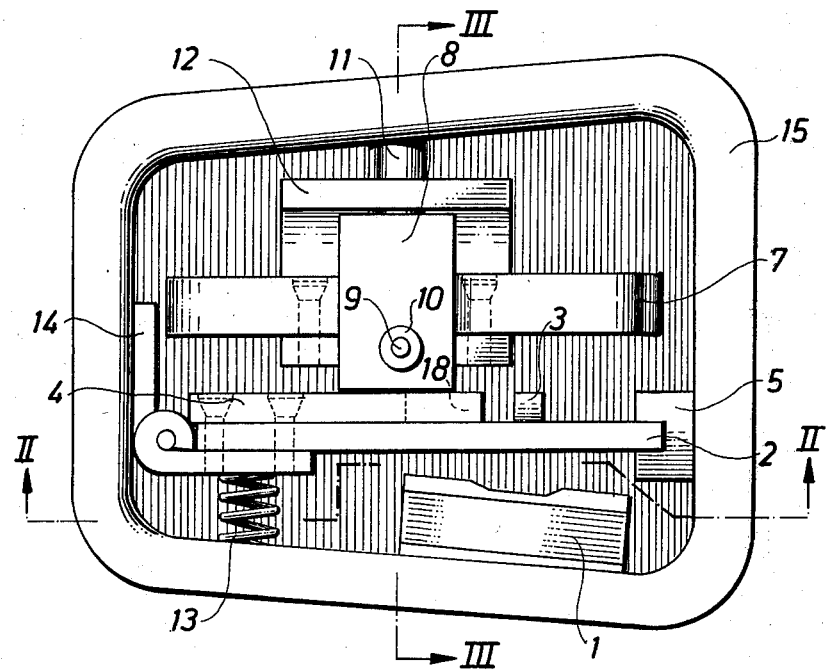

United States Patent [19]

Markl

[11] 3,994,183

[45] Nov. 30, 1976

[54] POSITION SELECTOR FOR INTERLOCKING DEVICE

[76] Inventor: Manfred Karl Markl, Les Collons, Valais, Switzerland

[22] Filed: Aug. 22, 1975

[21] Appl. No.: 606,800

[30] Foreign Application Priority Data

Aug. 23, 1974 Sweden .............................. 7410751

[52] U.S. Cl. .............................. 74/473 R; 180/82 A
[51] Int. Cl.² ........................................ B60R 25/02
[58] Field of Search ..................... 180/82 A, 103; 74/473 R, 474, 475, 477; 70/248, 250, 251; 116/DIG. 20

[56] References Cited
UNITED STATES PATENTS

| | | | |
|---|---|---|---|
| 1,427,212 | 8/1922 | Keller | 180/82 A |
| 1,499,427 | 7/1924 | Tullar | 74/473 X |
| 1,616,592 | 2/1927 | Martel | 70/248 X |
| 2,740,947 | 4/1956 | Davies | 180/82 A |
| 2,890,581 | 6/1959 | Lewis | 70/248 |
| 3,449,980 | 6/1969 | Hulten | 74/473 |
| 3,465,559 | 9/1969 | Rhodes | 74/473 X |
| 3,570,320 | 3/1971 | MacAfee et al. | 74/473 R |
| 3,587,351 | 6/1971 | Keller | 74/477 |
| 3,757,600 | 9/1973 | Bieber | 74/473 R |

*Primary Examiner*—Kenneth H. Betts
*Attorney, Agent, or Firm*—Edward H. Loveman

[57] ABSTRACT

A position selected locking apparatus for an automatic gear box which includes a yoke connected to the position selector and an electromagnetic lock for preventing motion of said yoke. An armature of the electromagnetic lock is biased into abutment with the yoke such that the yoke cannot move and thus the position selector is locked until the electromagnetic lock is energized to free the yoke.

4 Claims, 5 Drawing Figures

POSITION SELECTOR FOR INTERLOCKING DEVICE

The present invention refers to a position selector comprising an interlocking device, to-wit a interlocking device for the gear selector in automatically geared vehicles to prevent unintended operation of the gear box when the vehicle is parked.

In automatically geared vehicles the gear selector lever is brought to the P-position when the vehicle is parked. Hereby, the gear box is blocked preventing the vehicle from being moved and due to this generally applied construction the mechanical manual parking brake is normally not applied. However, if the gear selector lever is shifted from the P-position without the parking brake being applied there is a risk that the vehicle will start moving if it is placed on an inclined ground.

On several occasions it has happened that children who have been left in the car while the driver temporarily left the car, have playfully touched the gear selector lever to move it out of P-position causing the car to start moving with more or less serious accidents as a consequence.

It is a purpose of the present invention to prevent the position selector lever from being inadvertently moved out of the parking position when the ignition circuit to the motor is broken, i.e. when the ignition or starting key has been removed or is in the off-position.

This purpose is achieved with the aid of a device of the type defined in the enclosed claims indicating the characteristic features of the present invention.

Figure 2:
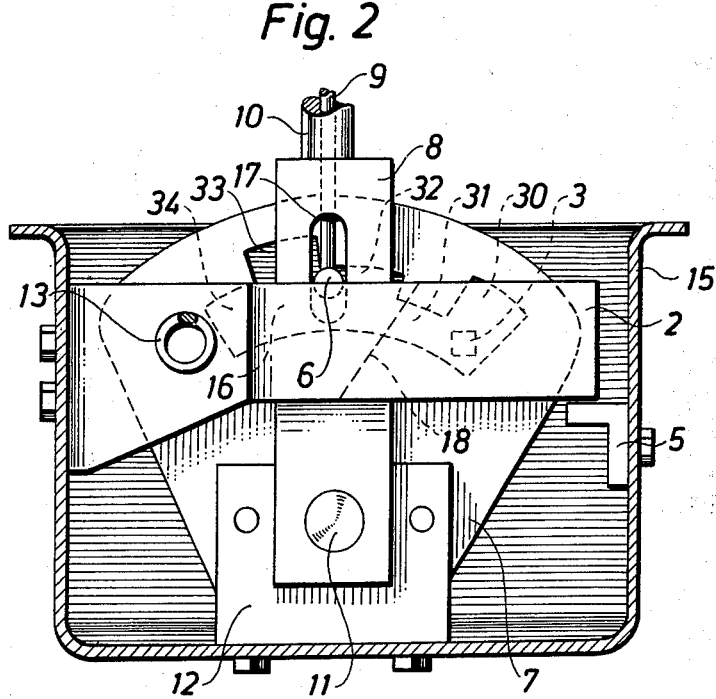
Figure 3:
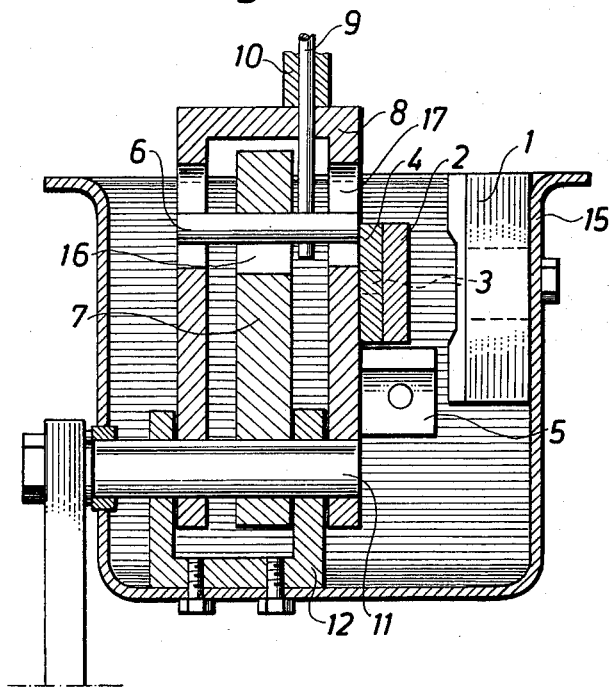
Figure 4:
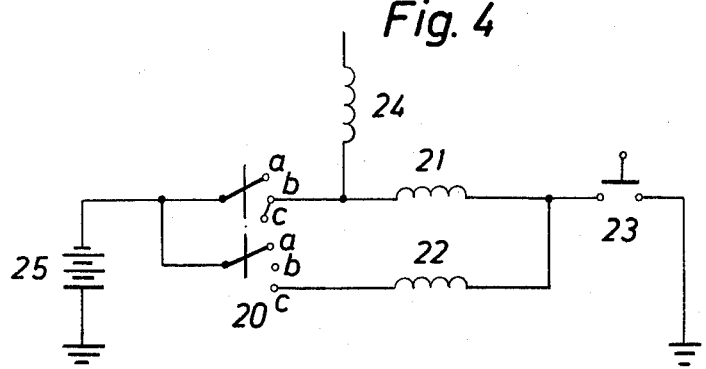
Figure 5:
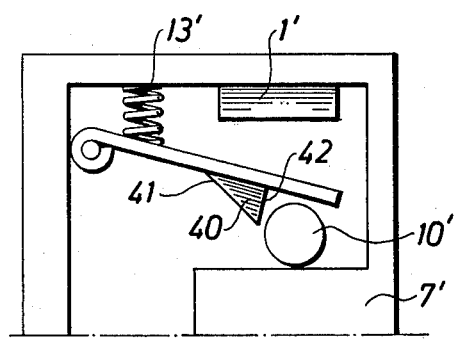

The invention is explained in greater detail by reference to the enclosed drawings in which FIG. 1 illustrates a position selector with interlocking device seen in plane view, FIG. 2 is a section along II—II in FIG. 1, FIG. 3 is a section along III—III in FIG. 1, FIG. 4 is a diagrammatic representation of a circuit for operating the interlocking device, and FIG. 5 schematically shows an embodiment of the invention in connection with a lying guide plate.

The position selector of FIGS. 1, 2 and 3 comprises a guide plate 7 fixed in a casing 15 by means of a support 12, a position selector lock 6 mounted on an operating arm 9 extending through the guide slot 16 of the guide plate 7 and being movable along said guide slot and radially in relation thereto. Moreover, a yoke lever 8 straddling the guide plate 7 is rotatably supported by a shaft 11 supported within casing 15, said shaft also extending through and being journalled in the guide plate 7 and the support 12. For the operation of the yoke lever 8 along the guide plate 7 a gear selector lever 10 is attached to the yoke lever 8 at the end thereof opposite to the pivoting point, an operating arm 9 being axially shiftable along the gear selector lever 10. The operating arm 9 is positioned within the gear selector lever 10 along the axial line of symmetry thereof and is operated by a spring-loaded knob, not shown, at the free end of the gear selector lever. When the knob, not shown, is depressed the position selector lock 6 is shifted away from recesses 30, 31, 32, 33 or 34 in the guiding slot 16 corresponding to the various positions of the gear selector lever 10 (P, N, 1, 2, R respectively) enabling the gear selector lever 10 and the yoke lever 8 connected thereto to be moved without restraint.

In order to obtain in the P-position of the gear selector lever 10 a locking action preventing the yoke lever 8 and thereby the gear box of the vehicle from being unintentionally operated, according to the invention, a locking bolt 3 fixed to a hingedly supported armature 2 is provided on the level of recess 30 of guiding slot 16. The armature 2 is supported by a bracket 14 firmly connected to casing 15 and is also supported by an angular bracket 5. The swinging movement of armature 2 is brought about, on the one hand, by a pressure spring 13 provided between the casing 15 and the armature 2 and, on the other hand, by a connectable and disconnectable electromagnet 1 which in the powered condition overcomes the resistance of spring 13 and attracts the armature 2. When electromagnet 1 is disengaged and the position selector lock 6 is in recess 30 spring 13 urges armature 2 and bolt 3 towards the yoke lever 8 to cause bolt 3 to enter into an aperture 17 provided in the yoke lever 8 for the position selector lock 6, the bolt 3 in this position preventing position selector lock 6 from being shifted along-side aperture 17 and out of recess 30 of the guiding slot 16. With bolt 3 in this position the gear selector lever 10 is prevented from being operated independently and with the aid of a spring-biased knob (not shown) out of the P-position. If however, the gear selector lever 10 is in any position other than the P-position the armature 2 abuts against the yoke lever 8 via an interposed slide plate 4 provided on the armature permitting the yoke lever 8 to be turned without restriction. However, if the movement is to pass over recess 30, bolt 3 will immediately hold the position selector lock 6 in recess 30 and thereby the yoke lever 8 from being moved further so that only an actuation of electromagnet 1 can release the position selector lock 6 from the bolt 3. In order additionally to prevent undesirable operation of the yoke lever 8 in the P-position the slide plate 4 is provided with a bevelled rebate 18 which in the P-position enters immediately in front of the side of the yoke lever 8 which in the direction of movement is turned away from the P-position.

FIG. 4 schematically illustrates the circuit for connecting and disconnecting the electromagnet 1. In series with a battery 25 there are provided an ignition lock 20, a magnet winding 21 of the electromagnet 1, a starting relay 22 and an operating switch 23. An ignition coil 24 is connected to the series circuit. The operating switch 23 is connected in such a way as to close the series circuit in the P- and N-positions of the gear selector lever and to interrupt the series circuit in the remaining positions thereof. As the ignition lock in automatically geared vehicles already has the function to enable the motor of the vehicle to be started only if the gear selector lever is in the P- and N-positions it is not necessary for the operating switch 23 to form a separate unit. Therefor, the magnet winding 21 can be connected directly to the ignition lock in accordance with the wiring diagram of FIG. 4.

The way of operation of the locking device is as follows:

With the gear selector lever 10 in the P-position, i.e. with the operating switch 23 actuated the motor of the vehicle is started by moving the contact arms of ignition lock 20 to a position c, spring-biased back to position b, the starting relay 22 being connected in position c. In position c as well as in position b corresponding to the operation of the motor the electromagnet 1 is connected by way of magnet winding 21. The position selector lever 10 can then be brought from the P-position to any of the remaining positions due to the fact that the armature 2 is attracted by electromagnet 1 to clear aperture 17 from bolt 3 and yoke lever 8 from rebate 18. As soon as a shift of the gear selector lever 10 to either of positions, 1, 2 or R is performed the operating switch 23 interrupts the current supply to the magnet winding 21 of electromagnet 1 permitting armature 2 to be pivoted back towards the yoke lever 8. In this state the contact surface of slide plate 4 will abut against yoke lever 8 the movement of which along the guide plate 7 is not hampered. By causing in this way electromagnet 1 to be operated only in the P- and N-positions of the gear selector lever the least possible current consumption is obtained. The presence of the locking device does not interfere with the operation of the gear box of the vehicle by the driver. After the termination of the ride the gear selector lever 10 is returned to the N- or P-position. Whereby, the operating switch 23 is actuated causing the electromagnet 1 to operate and to attract armature 2. Only when the ignition of the motor is disconnected, i.e. when the contact arms of ignition lock 20 are moved from position b to position a, the attracting force of electromagnet 1 towards armature 2 ceases and armature 2 will pivot inwardly towards the yoke lever 8. If the gear selector lever 10 is moved to or already is positioned in the P-position bolt 3 enters into aperture 17 and locks the position selector lock 6. At the same time the bevelled rebate 18 is swung inwardly to position in front of yoke lever 8 thereby additionally to secure yoke lever 8 in the locked position. It is now completely impossible to move the gear selector lever 10 out of the P-position unless the ignition of the motor is operated by means of the ignition lock 20.

In FIG. 5 an embodiment of the invention is shown as used in connection with a position selector having a lying guide plate 7'. A pivoting armature 2' in the form of an arm is mounted as previously described for pivotal movement between a locking position shown and a non-locking position in which armature 2' is attracted by electromagnet 1' which overcomes the force of spring 13' biasing armature 2' to the locking position.

Armature 2' is provided with a protrusion 40 having an inclined surface 41 extending from a point of the armature 2' near the pivot thereof outwardly from the side facing winding 1' and terminating in a surface 42 which extends substantially at right angles to armature 2'. The gear selector lever 10' may be passed to the position shown also when armature 2' is in the locking position by being moved along the inclined surface 41 which causes the armature to be pivotably displaced. When the gear selector lever 10' has passed the inclined surface armature 2' will be urged by spring action towards the gear selector lever and surface 42 will thereafter resist every attempt to move the lever from the locked position.

When electromagnet 1' is actuated the armature will be attracted and removed enabling the gear selector lever to be moved from the position in which it was locked. The electric circuit in this case operates as previously described.

In order to avoid certain problems that may present themselves due to the fact that the armature does not lose its magnetization the armature is suitably made of non-magnetic material with only some magnetic material adapted to be attracted by the electromagnet. If the armature is made of magnetic material certain of its surfaces may be coated with materials such as tin reducing such problems.

It is obvious for the expert on this field that also any position other than the P-position can be locked as well as several such positions which can be of importance in vehicles or machines other than motor-cars. The invention can also be used in steering-wheel geared motor-cars and the like and is not exclusively useful in connection with gear boxes in which the gear selector lever is positioned directly on the gear box although such a construction has been chosen as an example of the invention.

The device according to the invention can easily mounted in connection with generally available automatic gear boxes without undue alterations thereof and it forms a cheap and efficient security lock against unintentional operation of the gear selector lever.

The invention claimed is:

1. A device for locking a position selector in at least one predetermined position of a plurality of positions on an automatic gear box, said device comprising:
   a support means;
   a guide plate fixed to said support means;
   a yoke means straddling said guide plate and rotatably mounted on said support means;
   a position slector lever connected to said yoke means for rotating the same; and
   a locking means for preventing rotation of said yoke means, said locking means comprising:
      an armature hingedly mounted to said support;
      a spring means between said support and said armature for biasing said armature into abutment with said yoke means; and
      an electromagnetic means for moving said armature out of abutment with said yoke means thereby permitting rotation of said yoke means.

2. A device for locking a position selector as defined in claim 1, wherein said guide plate has a plurality of recesses and said yoke means includes a position selector lock for locking said yoke means in any one of said recesses.

3. A device for locking a position selector as defined in claim 1 wherein said yoke means has an aperture and said armature has a locking bolt means adapted to be extended into said aperture.

4. A device for locking a position selector as defined in claim 3, wherein said armature includes a slide plate for abutting said yoke means and permitting said yoke means to be rotated to any of a plurality of recesses in said guide plate whenever said locking bolt means is not engaged in said aperture.

* * * * *